Patented June 24, 1941

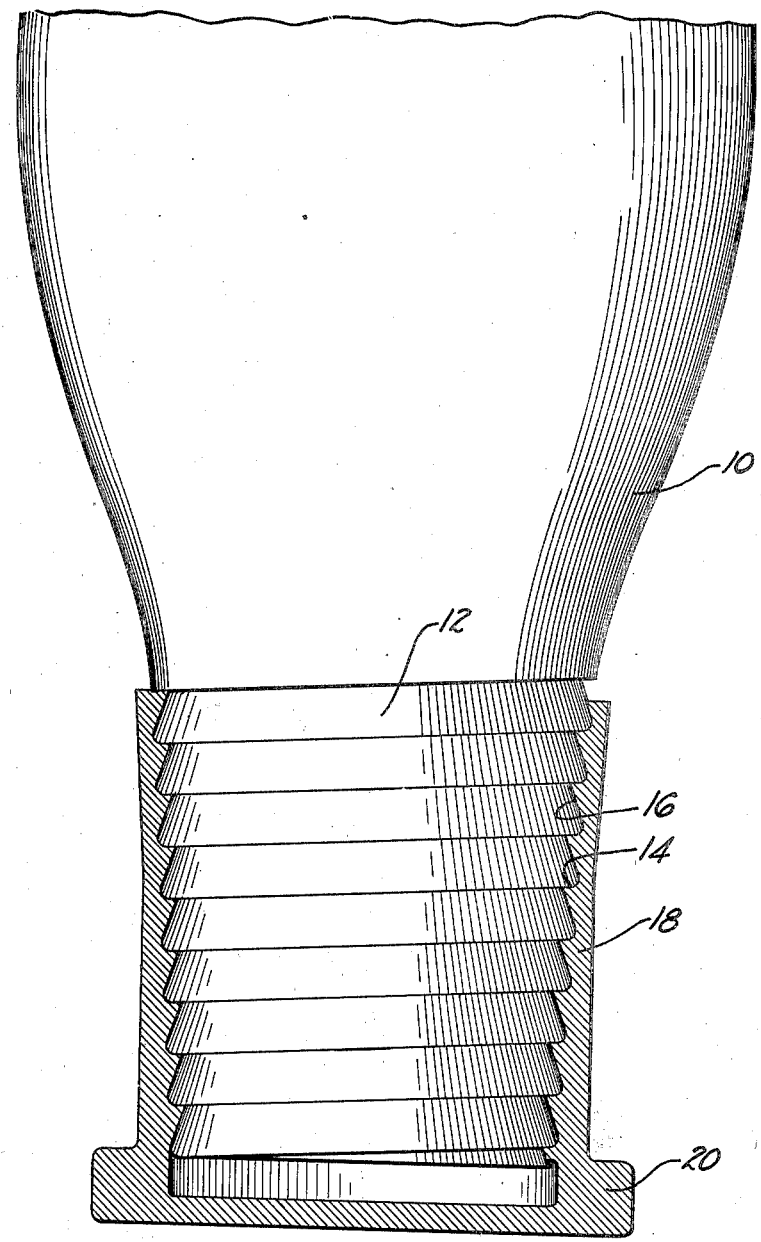

2,246,568

UNITED STATES PATENT OFFICE 2,246,568

COUPLING MEANS

Henry A. Berliner, Riverdale, Md., assignor to Engineering and Research Corporation, Riverdale, Md., a corporation of Maryland Application November 1, 1939, Serial No. 302,325

1 Claim. (Cl. 287—125)

This invention relates to coupling means and method and more particularly to the formation of a strong tension connection between materials of different elasticity. This invention is particularly applicable to the coupling of wood or other non-metallic propeller blades to metal ferrules.

If wooden blades or blades of other relatively yielding material are secured to ferrules by means of the usual type of closely fitting screw threads or rings, the blades have a tendency to break at the neck of the outermost ring or screw thread. This is due to the fact that the stress is concentrated at this point.

The present invention has for one of its principal objects the provision of a coupling which will distribute the stress substantially uniformly throughout the interfitting parts.

Another object of the invention is to provide a coupling between members of different rigidity in which the member of lesser rigidity is compressed when a stress is placed on the coupling.

Other objects, advantages and novel features of the invention will be apparent from the following description when read in connection with the accompanying drawing, in which the single figure is a partial side view of a propeller with parts in section.

The drawing illustrates a propeller blade 10 which may be formed of laminated wood or other material of relatively low rigidity. The root end of the blade is tapered and is formed with a spiral thread 12. The inner face of the thread is in the form of an abrupt shoulder 14 and the outer face 16 forms a relatively flat taper providing a plurality of axially spaced wedge surfaces extending along the root end of the blade.

The blade is mounted in a steel ferrule 18 adapted to be secured in a hub by means of a shoulder 20 or other desired type of fastening means. The interior surface of the ferrule is formed with threads complementary to the threads 12.

In use, the root end of the blade is screwed into the ferrule tightly and the ferrule is mounted in a hub, either rigidly as in the case of a fixed blade or rotatably in the case of a variable pitch mounting. As the blade is operated centrifugal force acting thereon creates a high tensile force on the coupling tending to pull the blade out of the ferrule. Since the thread surfaces 16 converge in the direction of tension on the blade, the root end of the blade will be compressed transversely due to the wedge action of the threads and will make the connection tighter as the pull increases. This action effectively distributes the stress throughout the entire root end of the blade and provides a very strong coupling.

If desired the coupling may be pre-stressed by heating the ferrule before the blade is screwed in or by cooling the blade or both. When this is done an initial compressive force will be exerted on the root end of the blade to anchor it more firmly in the ferrule.

The present invention provides a very strong, tight coupling which increases its holding force as tension is applied and which requires a very small amount of space. The taper of the blade root and of the ferrule socket enables the blade to be screwed into the ferrule quickly and easily and with any desired degree of tightness while the wedge action of the threads distributes the stress throughout the entire root of the blade so as to eliminate concentration of stress and minimize breaking.

It will be understood that the particular embodiment of the invention illustrated may be changed in many particulars and is not intended as a definition of the scope of the invention, reference being had for this purpose to the appended claim.

What is claimed is:

A threaded coupling between a non-metallic propeller blade of relatively low rigidity and a relatively rigid metal sleeve comprising a tapered root portion on the blade member formed with a continuous spiral thread having one face formed with a taper converging in the direction of the blade tip and a tapered socket in the sleeve to receive said root portion and formed with a spiral thread complementary to the thread on the blade root, the tapered faces of said threads acting by their wedging action to distribute the stresses due to centrifugal pull on the blade uniformly throughout the root of the blade.

HENRY A. BERLINER.